United States Patent [19]

Hasegawa et al.

[11] Patent Number: 4,711,329
[45] Date of Patent: Dec. 8, 1987

[54] HYDRAULIC CIRCUIT CONSTRUCTION FOR POWER SHIFT TRANSMISSION

[75] Inventors: Shigekazu Hasegawa, Sakai; Satoshi Machida, Sannan; Yoshimi Oota, Osaka, all of Japan

[73] Assignee: Kubota, Ltd., Osaka, Japan

[21] Appl. No.: 850,861

[22] Filed: Apr. 11, 1986

[30] Foreign Application Priority Data

Aug. 28, 1985 [JP] Japan .................. 60-190156
Aug. 30, 1985 [JP] Japan .................. 60-192334

[51] Int. Cl.$^4$ .................................................. B60K 41/22
[52] U.S. Cl. ................................ 192/3.57; 192/85 R; 192/109 F
[58] Field of Search .............. 192/109 F, 85 R, 52, 192/3.57

[56] References Cited

U.S. PATENT DOCUMENTS

| | | | |
|---|---|---|---|
| 3,896,705 | 7/1975 | Patton | 192/109 F X |
| 4,046,162 | 9/1977 | Rodeghiero | 192/109 F X |
| 4,265,346 | 5/1981 | Emmadi | 192/109 F X |
| 4,289,221 | 9/1981 | Chambers et al. | 192/3.57 |
| 4,469,011 | 9/1984 | Loffler | 192/52 X |
| 4,579,015 | 4/1986 | Fukui | 74/335 X |

Primary Examiner—Rodney H. Bonck
Attorney, Agent, or Firm—Gifford, Groh, VanOphem, Sheridan, Sprinkle and Dolgorukov

[57] ABSTRACT

A hydraulic circuit construction for a power shift transmission having logical operation valves mounted on a pressure oil supply passage connecting a hydraulic clutch to a pressure oil source, the logical operation valves being operable to engage and disengage the hydraulic clutch by opening and closing the pressure oil supply passage in response to a switching operation of a change speed device connected upstream of and in series to the hydraulic clutch. The pressure oil supply passage has mounted thereon a pressure control device including a first valve mechanism, a second valve mechanism and an orifice parallel-connected to the pressure oil supply passage, and an accumulator is mounted between the pressure control device and the hydraulic clutch to assure a speedy and smooth operation of the hydraulic clutch.

9 Claims, 6 Drawing Figures

HYDRAULIC CIRCUIT CONSTRUCTION FOR POWER SHIFT TRANSMISSION

BACKGROUND OF THE INVENTION

The present invention relates to a hydraulic circuit construction for a power shift transmission, and more particularly to a hydraulic circuit construction for a power shift transmission wherein a hydraulically operable clutch is disengaged in response to a neutral position assumed by a change speed device and is engaged in response to change speed positions assumed by the change speed device.

A known power shift transmission of this type comprises a hydraulically operable multidisk type clutch connected in series to a propelling drive transmission line, and a valve linked to a change speed device of the propelling drive transmission line for engaging and disengaging the clutch in response to operations of the change speed device.

Where only the valve is provided for operating the hydraulic clutch, the pressure of oil supplied to the clutch increases within a very short time when the clutch is engaged. This results in a shock occurring as the clutch is engaged.

In order to solve this problem it is conceivable to provide a throttle valve on an oil passage for supplying the oil to cause the pressure of oil supplied to the clutch to increase gently. However, this solution gives rise to a different problem of slackening an entire operating stroke for disengaging the clutch. It has a further disadvantage that, since the throttle valve is operative also when the clutch is engaged, the clutch tends to slip in the event of leakage at the engaged clutch.

SUMMARY OF THE INVENTION

The object of the present invention is to provide a rational arrangement of hydraulic devices which produces a minimal shock when the clutch is engaged, without reducing the clutch operating speed.

According to one aspect of the invention a hydraulic circuit construction for a power shift transmission having logical operation valve means mounted on a pressure oil supply passage connecting a hydraulic clutch to a pressure oil source, the logical operation valve means being operable to engage and disengage the hydraulic clutch by opening and closing the pressure oil supply passage in response to a switching operation of change speed means connected upstream of and in series to the hydraulic clutch, the hydraulic circuit construction comprising pressure control means mounted on the pressure oil supply passage and including a first valve means, a second valve means and orifice means mounted parallel to one another on the pressure oil supply passage, the first valve means being switchable from an open position to a closed position when a pilot pressure from a hydraulic clutch side reaches a first predetermined value, the second valve means being switchable from a closed position to an open position when the pilot pressure reaches a second predetermined value greater than the first predetermined value, and accumulator means mounted on the pressure oil supply passage and between the hydraulic clutch and the pressure control means.

With the above construction, when the pressure at an input side of the hydraulic clutch begins to rise, the input side pressure is raised slowly by the action of the orifice means first. When the pressure reaches the second predetermined value, the second valve means is opened to permit the input side pressure to rise speedily. Since an operative time period of the accumulator is provided during the first half of the time in which the orifice means is operative, the input side pressure of the clutch is increased further slowly in the operative time period of the orifice means.

Thus, by rationally arranging the two valve means, the orifice means and the accumulator and setting the pressures for operating the two valve means, the so-called half-clutch state occurring as the clutch is engaged is maintained over a relatively long time by increasing the operating pressure slowly. This is effective to mitigate the shock taking place when the clutch is engaged. Moreover, the clutch is operable without reducing its operating speed by promptly increasing the operating pressure toward the end of the clutch engaging operation.

BRIEF DESCRIPTION OF THE DRAWINGS

The above and other objects and features of the present invention will become apparent from the following description taken in conjunction with the preferred embodiment thereof with reference to the accompanying drawings, in which.

DESCRIPTION OF THE PREFERRED EMBODIMENTS

Figure 1:
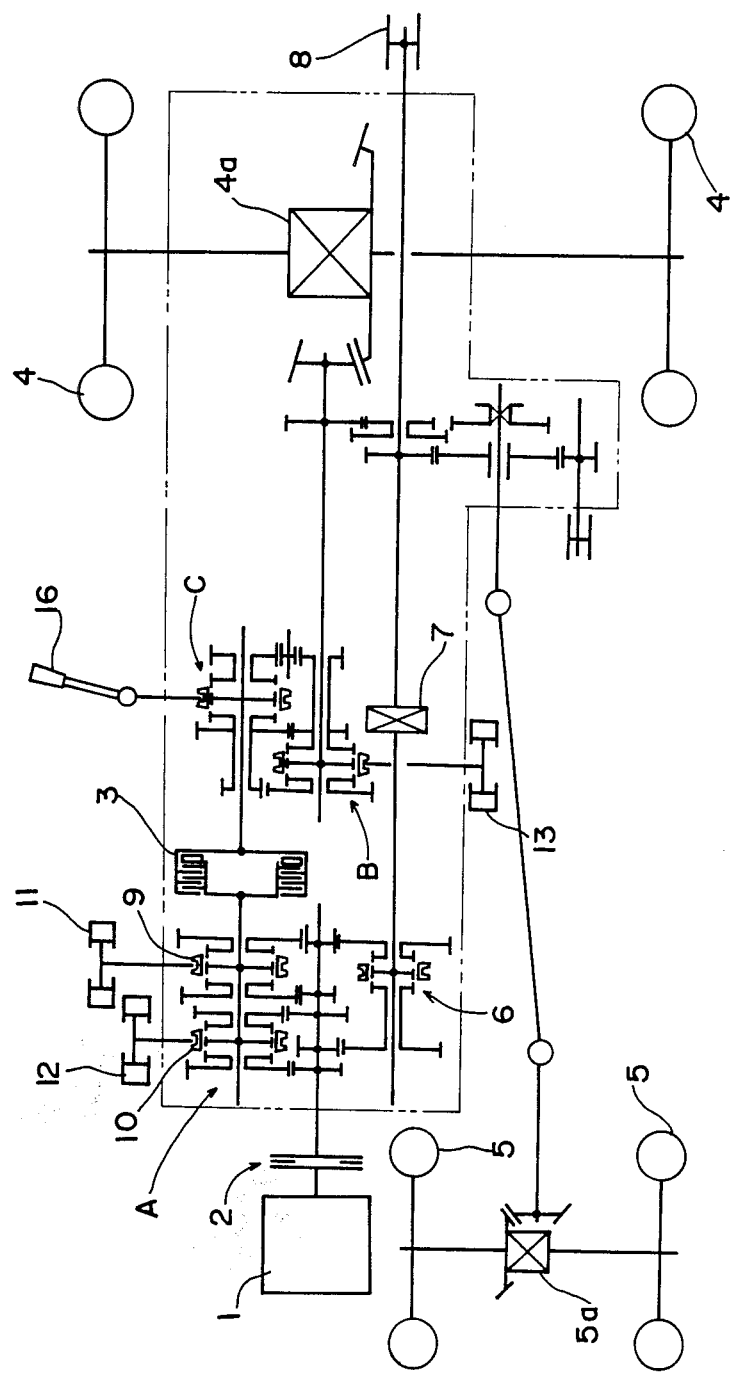
FIG. 1 is a schematic view of a transmission structure of an agricultural tractor.

Referring to FIG. 1, the propelling drive transmission line of a four wheel drive agricultural tractor comprises a main change speed device A, a multidisk type hydraulic clutch 3, an auxiliary change speed device B and a backward and forward drive switching device C arranged in series to receive power of an engine 1 through a main clutch 2. An output of the backward and forward drive switching device C is divided for transmission to a differential 4a for driving rear wheels 4 and to a differential 5a for driving front wheels 5. The power takeoff line comprises a change speed device 6, a unidirectional rotary clutch 7 and a power takeoff shaft 8 arranged in series to receive the power of the engine 1 through the main clutch 2.

The main change speed device A includes two synchromesh change speed gear mechanisms 9 and 10 and provides four speeds. The auxiliary change speed device B and backward and forward drive switching device C also include synchromesh change speed gears and share part of the gears therebetween.

Figure 2:
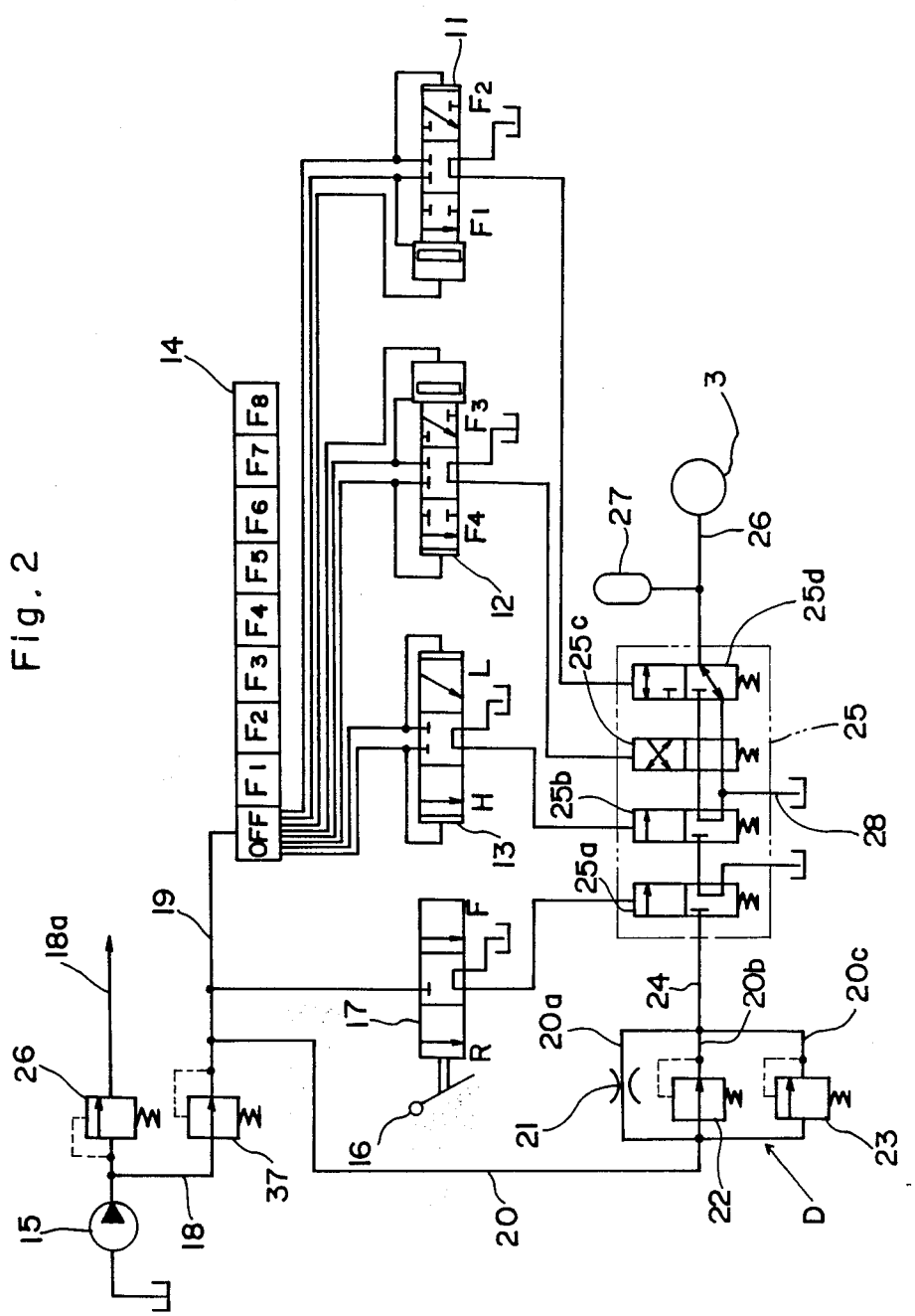
FIG. 2 is a hydraulic circuit construction for a power shift transmission, FIG. 3 includes graphs showing pressure variations occurring at various positions at times of change speed operation.

As shown in FIGS. 1 and 2, the main change speed device A and the auxiliary change speed device B are shiftable by two hydraulic cylinders 11 and 12 and by one hydraulic cylinder 13, respectively. The three hydraulic cylinders 11, 12 and 13 are actuated by pressure oil supplied from a hydraulic pump 15 through a propelling drive change speed valve 14.

The change speed valve 14 is the rotary type and is operable to effect an eight-step speed changing through a combination of the main change speed device A and auxiliary change speed device B.

Each of the three hydraulic cylinders 11, 12 and 13 comprises a switch valve having three operative positions, and is adapted to produce a pilot pressure when shifted to a position other than neutral.

However, the hydraulic cylinder 13 for operating the auxiliary change speed device B is shiftable to only two positions, namely a low speed position L and a high speed position H, and its neutral position is effective only in the course of its shifting operation.

The backward and forward drive switching device C is manually operated by means of a rocking hand lever 16, and the manual operating line therefor includes a hydraulic valve 17. This hydraulic valve 17 is adapted to produce a pilot pressure when shifting the backward and forward drive switching device C to a forward drive position F or a reverse drive position R.

The hydraulic clutch 3 is engageable by oil pressure supplied thereto. An oil passage 18 extending from the hydraulic pump 15 is branched into two passages, one passage 19 extending to the change speed valve 14 and the other passage 20 extending to the hydraulic clutch 3.

The hydraulic clutch 3 is automatically disengaged when one of the main change speed device A, auxiliary change speed device B and backward and forward drive switching device C is operated, and is automatically engaged again when the operation is completed. Therefore, the change speed operation is effected without disengaging the main clutch 2.

More particularly, a pressure control device D is mounted on the oil passage 20, which comprises a throttle valve 21, a first valve mechanism 22 and a second valve mechanism 23 mounted respectively on three flow passages 20a, 20b and 20c branched from the oil passage 20. The first valve mechanism 22 is closed when the pilot pressure from the hydraulic clutch 3 reaches a predetermined value, and the second valve mechanism 23 is opened when the pilot pressure from the hydraulic clutch 3 exceeds the predetermined value. An oil passage 24 extending from the pressure control device D includes a group of logical operation valves 25 including four logical operation valves 25a–25d operable by the pilot pressures from the hydraulic valve 17 and the three hydraulic cylinders 11, 12 and 13, respectively. Further, an accumulator 27 is mounted on an oil passage 26 extending from the logical operation valves 25 to the hydraulic clutch 3.

When the main change speed device A is operated to run the tractor, the logical operation valves 25 are opened to maintain the hydraulic clutch 3 engaged. When either the main change speed device A, auxiliary change speed device B or backward and forward drive switching device C is switched while the tractor is running, the pilot pressures from these switch valves drop in the course of the switching operation whereby the logical operation valves 25 break the oil supply from the hydraulic pump 15 and at the same time permit the oil to flow into a drain passage 28 thereby to disengage the hydraulic clutch 3. When the switching operation is completed, the logical operation valves 25 are opened again to engage the hydraulic clutch 3.

As described hereinbefore, the pressure control device D and the accumulator 27 are provided in order to ease the shock occurring when the hydraulic clutch 3 is engaged, and to shorten the time required before the hydraulic clutch 3 assumes the engaged position. This function will be described next, taking for example the case where the hydraulic cylinder 11 for effecting a first and a second speeds of the main change speed device A is switched from a first speed side to a second speed.

Figure 3:
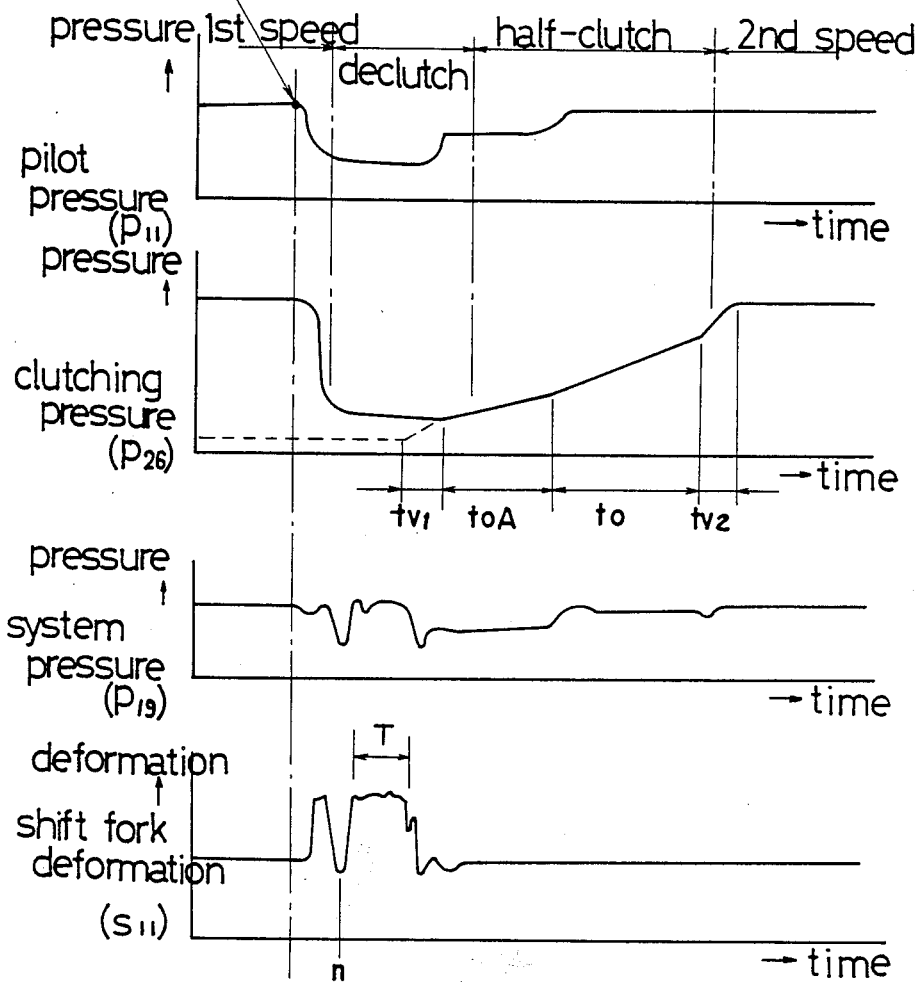

FIG. 3 graphically shows variations in the pilot pressure P11 from the hydraulic cylinder 11, variations in the pressure P26 of the oil passage 26 for the hydraulic clutch 3, variations in what is known as the system pressure P19 of the oil passage 19 for the change speed valve 14, and variations in an amount of deformation S11 of a shift fork operable by the hydraulic cylinder 11. When the hydraulic cylinder 11 starts to operate, the pilot pressure P11 starts to drop immediately thereafter which causes the logical operation valves 25 to close. As a result, the pressure P26 of the oil passage 26 drops thereby disengaging the hydraulic clutch 3.

Since the hydraulic cylinder 11 causes the shift fork to actuate a change speed sleeve, the amount of deformation S11 of the shift fork increases. This deformation reduces once when the change speed sleeve reaches a neutral position n.

Subsequently as the hydraulic cylinder 11 operates beyond the neutral position 7, the shift fork actuates the change speed sleeve and causes the sleeve to come into synchromesh. Thus the amount of deformation S11 of the shift fork is increased for a time T required for the synchronizing action. After the sleeve has been shifted, the amount of deformation S11 of the shift fork reduces.

When the change speed operation is completed as above, the pressure P11 rises and as a result the logical operation valves 25 are opened.

When the pressure P26 of the oil passage 26 begins to rise, the first valve mechanism 22 of the pressure control device D is kept closed and the oil is supplied only through the throttle valve 21. With the oil supplied only through the throttle valve 21, the pressure P26 of the oil passage 26 slowly rises in a time period $to_A$ in which the throttle valve 21 and the accumulator 27 function and in a time period to in which the accumulator 27 stops functioning and the throttle valve 21 mainly functions.

In other words, the hydraulic clutch 3 is engaged in the course of these two time periods $to_A$ and to. During these periods the hydraulic clutch 3 is not completely engaged but is in a state known as halfclutched state. Therefore, the hydraulic clutch 3 is engaged the more gently the longer the two periods are.

When finally the second valve mechanism 23 is opened, the oil passage pressure at the side of the pressure control device D opposed to the hydraulic clutch 3 is transmitted as it is to the oil passage 24 extending from the pressure control device D toward the hydraulic clutch 3 whereby the latter is completely engaged.

The time required for the action of the first valve mechanism 22 is shortened by arranging the logical operation valves 25 downstream of the pressure control device D. The first valve mechanism 22 will operate every time the hydraulic clutch 3 is engaged if the logical operation valves 25 are arranged upstream of the pressure control device D.

A time period $tv_2$ represents a period in which the pressure P26 of the oil passage 26 is raised by the second valve mechanism 23. A time period shown by a broken line in FIG. 3 is a time period $tv_1$ in which the first valve mechanism 22 is operative. This time period tv₁ mainly functions to slowly increase the pressure D26 of the oil passage 26 when the engine 1 is started and the main change speed device A is operated from neutral to the first speed position.

The hydraulic circuitry further includes a valve 37 on the oil passage 18 extending from the pump 15 in order to lessen inconveniences resulting from high-speed operations of the hydraulic cylinders 11 and 12. The valve 37 is adapted to close when a downstream pressure of the oil passage 18 exceeds a predetermined value. Therefore, by setting the pressure for closing the valve 37 to a sufficient value to maintain the hydraulic clutch 3 engaged, a time required for disengaging the clutch 3 by drained oil can be shortened.

As seen, an oil passage 18a including a relief valve 26 is branched from a position of the oil passage 18 upstream of the valve 37 so that a power steering device or other hydraulically operable device may receive pressure oil from the hydraulic pump 15 exceeding the predetermined pressure.

Figure 4:
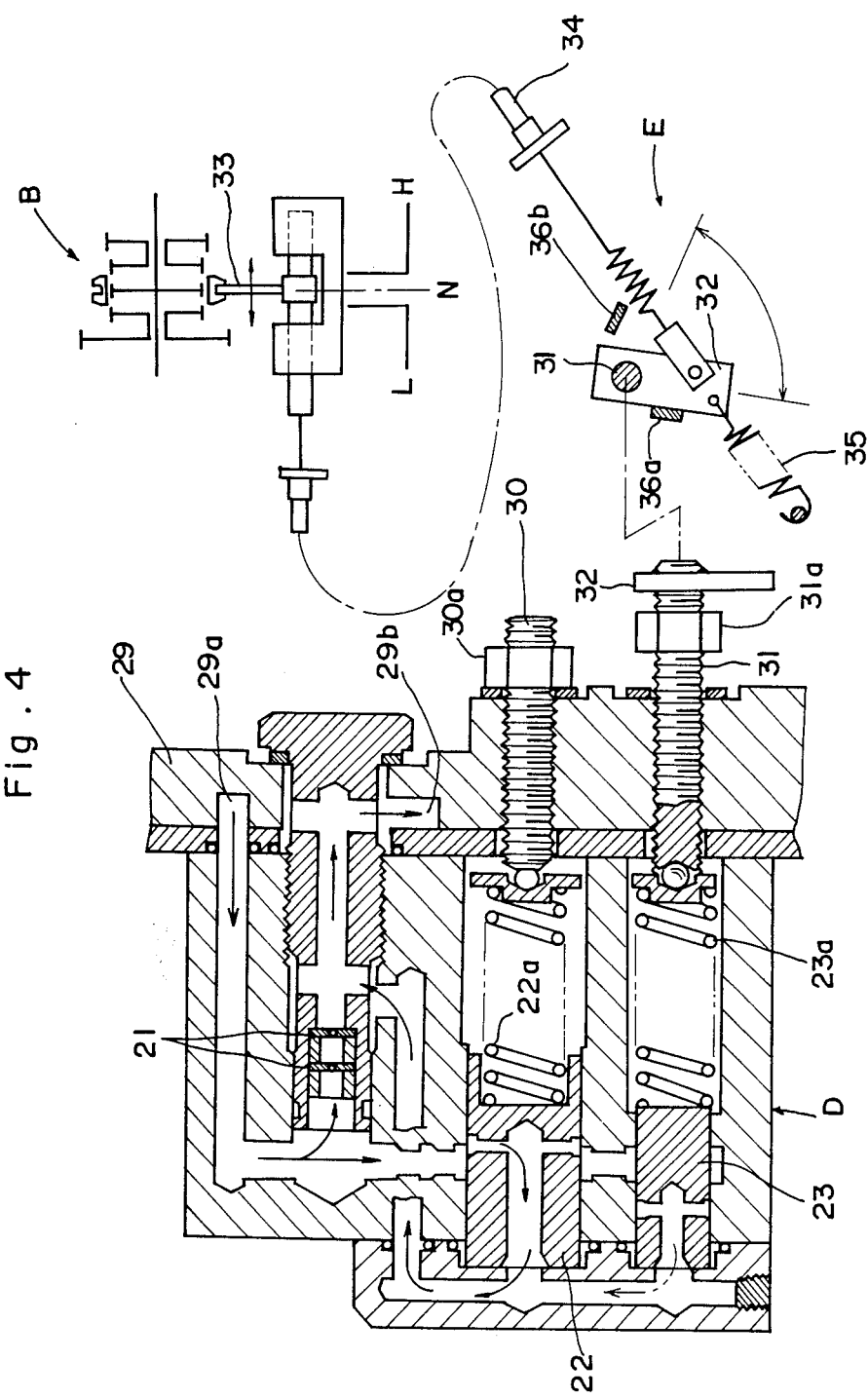
FIG. 4 is a sectional view of a pressure control device linked to an auxiliary change speed device.
Figure 6:
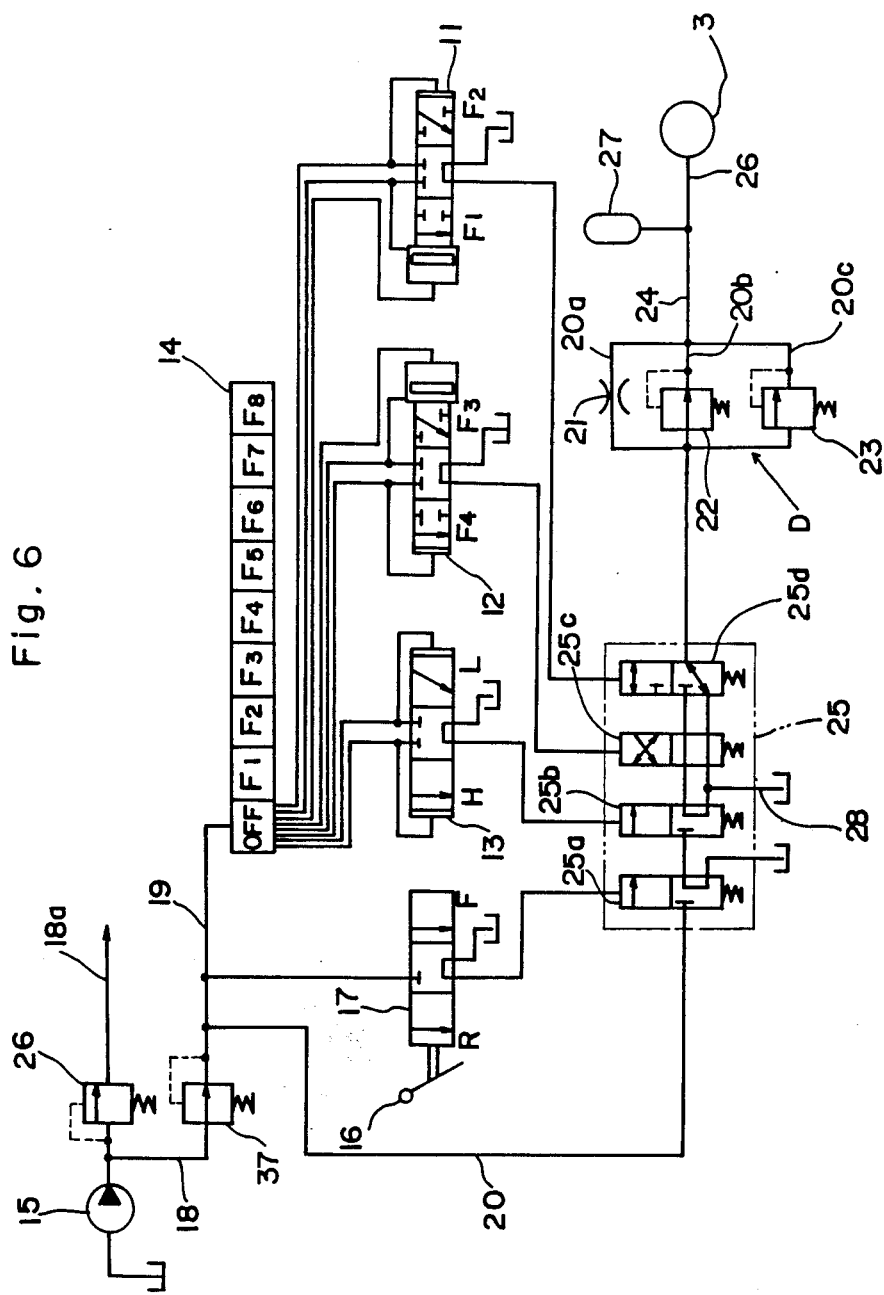
FIG. 6 is a hydraulic circuit construction for an alternative embodiment of a power shift transmission.

Referring to FIG. 4, the pressure control device D has a one block construction including the throttle valve 21 which is formed of two plate members, the first valve mechanism 22 urged by a spring 22a and operable when the pilot pressure reaches the predetermined value, and the second valve mechanism 23 urged by a spring 23a and operable when the pilot pressure exceeds the predetermined value.

The pressure control device D receives the pressure oil from the hydraulic pump 15 through a flow passage 29a defined in a plate member 29 constituting a transmission case of the tractor, and supplies the pressure oil to the logical operation valves 25 through a flow passage 29b defined in the plate member 29. The two flow passages 29a and 29b form part of the oil passages 20 and 24, respectively.

The first and second valve mechanisms 22 and 23 include adjuster bolts 30 and 31 extending through the plate member 29 to permit operating characteristics of the valve mechanisms 22 and 23 to be selected as appropriate. Specifically, the urging forces of the springs 22a and 23a of the first and second valve mechanisms 22 and 23 are variable by turning the adjuster bolts 30 and 31 and tightening nuts 30a and 31a, respectively.

Figure 5:
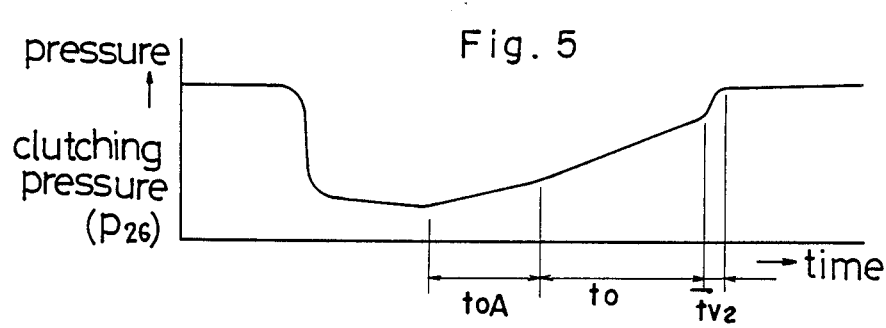
FIG. 5 is a graph showing a half-clutch state of a hydraulic clutch extended by the pressure control device.

The adjuster bolt 31 of the second valve mechanism 23 has an outward end connected to an upper end of an arm 32. A lower end of the arm 32 is connected through a wire 34 to a shift fork 33 of the auxiliary change speed device B. When the shift fork 33 is shifted rightward in FIG. 4 setting the auxiliary change speed device B to the high-speed position, the arm 32 is caused through the wire 34 to pivot counterclockwise in FIG. 4. This turns and tightens the adjuster bolt 31 thereby increasing the urging force of the spring 23a of the second valve mechanism 23. Consequently, as already described and as shown in FIG. 5, the time period to is extended when the urging force of the spring 23a of the second valve mechanism 23 is increased. When the shift fork 33 is shifted to neutral, the arm 32 is pivoted clockwise in FIG. 4 by the action of a tension spring 35, thereby returning the spring 23a of the second valve mechanism 23 to an initial state. Numbers 36a and 36b in FIG. 4 denote stoppers to determine a pivoting range of the arm 32. The adjuster bolt 31 of the second valve mechanism 23 is longer than the adjuster bolt 30 of the first valve mechanism 22. The adjustment range of the urging force of the spring 23a of the second valve mechanism 23 provided through the nut 31a is equal to or greater than that of the first valve mechanism 22.

According to this construction, when the main change speed device A is operated with the auxiliary change speed device B shifted to the high-speed position, the pressure rise in the oil passage 18 continues for a longer time, as represented by the time period to of FIG. 5, than when the auxiliary change speed device B is in the low-speed position.

Thus, when the tractor is running at high speed and is subjected to a great speed loss at speed changing times because of a great running resistance, only a minor shock will occur at such times since the half-clutch state is maintained for a considerable time by the function of the throttle valve which extends the clutch operating time. When the tractor is running at low speed and no great speed loss occurs at speed changing times, an appropriate half-clutch state is obtained thereby causing only a minor shock at such times also.

What is claimed is:

1. A hydraulic circuit construction for a power shift transmission having logical operation valve means mounted on a pressure oil supply passage connecting a hydraulic clutch to a pressure oil source, the logical operation valve means being operable to engage and disengage said hydraulic clutch by opening and closing the pressure oil supply passage in response to a switching operation of change speed means connected upstream of and in series to said hydraulic clutch, said hydraulic circuit construction comprising;

pressure control means mounted on said pressure oil supply passage and including a first valve means, a second valve means and orifice means mounted parallel to one another on said pressure oil supply passage, said first valve means being switchable from an open position to a closed position when a pilot pressure from a hydraulic clutch side reaches a first predetermined value, said second valve means being switchable from a closed position to an open position when the pilot pressure reaches a second predetermined value greater than the first predetermined value, and accumulator means mounted on the pressure oil supply passage and between said hydraulic clutch and said pressure control means.

2. A hydraulic circuit construction as claimed in claim 1 wherein said logical operation valve means is disposed upstream of the pressure control means.

3. A hydraulic circuit construction as claimed in claim 1 wherein said logical operation valve means is disposed downstream of the pressure control means.

4. A hydraulic circuit construction as claimed in claim 1 wherein said change speed means is shiftable by hydraulically operable switch means connected to said pressure oil source through a change speed valve, said switch means being connected to the logical operation valve means to close said logical operation valve means by a pilot pressure thereof when the switch means assumes a neutral position and to open said logical operation valve means when the switch means assumes a change speed position.

5. A hydraulic circuit construction as claimed in claim 4 wherein the oil passage for supplying pressure oil through the change speed valve to the switch means is branched from said pressure oil supply passage, said pressure oil supply passage including a valve upstream of a position from which said oil passage branches off, said valve being adapted to close when a pressure downstream of said pressure oil supply passage exceeds a predetermined value.

6. A hydraulic circuit construction as claimed in claim 4 wherein said change speed means includes main change speed means and auxiliary change speed means, and said switch means includes a first hydraulically operable switch means for shifting said main change speed means and a second hydraulically operable switch means for shifting said auxiliary switch means, said first and second switch means being connected in parallel to each other to said change speed valve and also connected to said logical operation valve means.

7. A hydraulic circuit construction as claimed in claim 6 wherein said auxiliary change speed means is linked to said pressure control means such that an amount of oil supplied per unit time through said pressure control means is smaller when the auxiliary change speed means is shifted to a high speed position than when the auxiliary change speed means is shifted to a low speed position.

8. A hydraulic circuit construction as claimed in claim 7 wherein said auxiliary change speed means is linked to the pressure control means by a wire extending between a shift fork of the auxiliary change speed means and means for adjusting an urging force of an operational pressure setting spring of said second valve means.

9. A hydraulic clutch pressure control apparatus comprising;
    a hydraulic clutch connected to a pressure oil source through a pressure oil supply passage,
    pressure control means mounted on said pressure oil supply passage and including a first valve means, a second valve means and orifice means mounted parallel to one another on said pressure oil supply passage,
    said first valve means being switchable from an open position to a closed position when a pilot pressure from a hydraulic clutch side reaches a first predetermined value,
    said second valve means being switchable from a closed position to an open position when the pilot pressure reaches a second predetermined value greater than the first predetermined value, and
    accumulator means mounted on the pressure oil supply passage and between said hydraulic clutch and said pressure control means.

* * * * *